United States Patent
Sareen (10) Patent No.: US 7,895,114 B2
(45) Date of Patent: Feb. 22, 2011

(54) METHOD AND SYSTEM FOR REPATRIATING EARNINGS

(75) Inventor: Gautam Sareen, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 686 days.

(21) Appl. No.: 11/260,908

(22) Filed: Oct. 28, 2005

(65) Prior Publication Data

US 2007/0100721 A1  May 3, 2007

(51) Int. Cl.
*G06Q 40/00* (2006.01)
(52) U.S. Cl. .................. 705/37; 705/35; 705/36 R
(58) Field of Classification Search ............... 705/37
See application file for complete search history.

(56) References Cited

U.S. PATENT DOCUMENTS

| | | | |
|---|---|---|---|
| 4,588,192 A | 5/1986 | Laborde | |
| 4,648,038 A | 3/1987 | Roberts et al. | |
| 6,205,433 B1 | 3/2001 | Boesch et al. | |
| 6,263,321 B1 | 7/2001 | Daughtery | |
| 6,381,585 B1 | 4/2002 | Maples et al. | |
| 6,598,028 B1* | 7/2003 | Sullivan et al. | 705/36 R |
| 7,219,079 B2 | 5/2007 | Birle, Jr. et al. | |
| 7,246,094 B1 | 7/2007 | Butcher | |
| 7,257,555 B1 | 8/2007 | Farr | |
| 7,257,556 B1 | 8/2007 | Rifkin | |
| 2002/0087373 A1 | 7/2002 | Dickstein | |
| 2003/0023536 A1 | 1/2003 | Hollerman | |
| 2003/0028467 A1* | 2/2003 | Sanborn | 705/36 |
| 2003/0050884 A1 | 3/2003 | Barnett | |
| 2003/0074300 A1 | 4/2003 | Norris | |
| 2003/0120578 A1* | 6/2003 | Newman | 705/36 |
| 2003/0158809 A1* | 8/2003 | Carney et al. | 705/37 |
| 2004/0098327 A1 | 5/2004 | Seaman | |
| 2004/0117282 A1 | 6/2004 | Green et al. | |
| 2004/0162774 A1 | 8/2004 | Golden | |
| 2005/0055303 A1 | 3/2005 | Routtenberg | |
| 2005/0075976 A1* | 4/2005 | Woodruff et al. | 705/40 |
| 2005/0086148 A1* | 4/2005 | Woodruff et al. | 705/36 |
| 2005/0102206 A1 | 5/2005 | Savasoglu et al. | |
| 2005/0160034 A1 | 7/2005 | Woodruff et al. | |
| 2006/0117303 A1* | 6/2006 | Gizinski | 717/136 |
| 2007/0106588 A1 | 5/2007 | Kulak | |

OTHER PUBLICATIONS

Michael J. Fleming and Kenneth D. Garbade. The Repurchase Agreement Refined: GCF Repo. Jun. 2003. Federal Reserve Bank of New York. vol. 9, No. 6, pp. 1-7.

(Continued)

*Primary Examiner*—Jagdish N Patel
*Assistant Examiner*—Kevin Poe
(74) *Attorney, Agent, or Firm*—Lowenstein Sandler PC (57) ABSTRACT

A financial instrument comprises a forward contract with a first maturity date, a preferred security with the first maturity date, and a debt instrument with a second maturity date that is after the first maturity date. The forward contract is issued by a parent company, the preferred security is issued by a subsidiary of the parent company, and the debt instrument is issued by the subsidiary of the parent company.

18 Claims, 9 Drawing Sheets

OTHER PUBLICATIONS

Yoko Shibata, Repos provide Yanks with niche in Japan. Global Finance. Aug. 1994, vol. 8, Issue 8, pp. 17-22.

Ron Morrow. Repo, reverse repo and securities lending markets in Canada. Bank of Canada Review. Winter 1994/1995 pp. 61-72.

Barron's Dictionary of Finance and Investment terms. Fifth Edition. Copyright 1998 p. 60.

Frank Souder. The US repo and securities lending markets. International Securities Lending 1995-1996. pp. 225-227.

Repos rising. International Finance Law Review. London 2007, p. 1.

PSA has guidelines for CMO repos. National mortgage news. New York, Jan. 29, 1996, vol. 20 issue 17, p. 12.

Brad Finkelstein. Chase starting commercial MBS unit. National mortgage news. New York. Sep. 18, 1995, vol. 19, issue 48 pp. 1-4.

TCAM's new sec lending and repo system. International securities lending. London. Fourth quarter 1995. p. 7.

Jennifer Ablan. Deutsche Bank Unit Launches Web Site for Research, Convertible-Bond Trading. Wall Street Journal (eastern ed.) NY, NY. Sep. 18, 2000, p. C15.

* cited by examiner

METHOD AND SYSTEM FOR REPATRIATING EARNINGS

The invention generally relates to financial instruments, and more specifically to financial instruments that can be used to repatriate dividends or earnings from a subsidiary to a parent.

BACKGROUND

A number of debt and equity instruments are known and used in financing. Combinations of different instruments that achieve financing objectives with consideration for tax implications are needed.

The preceding description is not to be construed as an admission that any of the description is prior art relative to the present invention.

SUMMARY OF THE INVENTION

In one aspect, the invention provides a financial instrument comprising a forward contract with a first maturity date, a preferred security with the first maturity date, and a debt instrument with a second maturity date that is after the first maturity date. The forward contract is issued by a parent company, the preferred security is issued by a subsidiary of the parent company, and the debt instrument is issued by the subsidiary of the parent company.

In one aspect, the invention further comprises a guarantee by the parent on payments due under the debt instrument. In one aspect, the invention further comprises a pledge of the preferred security as collateral for settlement of the forward contract. In one aspect, the invention further comprises a pledge of the debt instrument as collateral for settlement of the forward contract. In one aspect, the invention further comprises a provision wherein a holder of the financial instrument does not participate in a predetermined percentage of stock price upside. In one aspect, the predetermined percentage is approximately the first twenty percent. In one aspect, the subsidiary is an offshore subsidiary. In one aspect, the forward is an equity forward. In one aspect, the debt instrument is a bond. In one aspect, the first maturity date is approximately three years after issue of the financial instrument and the second maturity date is approximately five years after issue of the financial instrument. In one aspect, the subsidiary satisfies a test for financing ability independent of the parent. In one aspect, the test for financing ability independent of the parent is substantially as described in Plantation Patterns Inc. v. Commissioner of Internal Revenue, 462 F.2d 712 (5th Cir. 1972). In one aspect, the subsidiary is newly formed.

In one aspect, the invention provides a system and method for financing by a subsidiary of a parent company. The system and method comprise selling a forward contract to an investor, the forward contract having a first maturity date. The system and method further comprise selling a preferred security to the investor, the preferred security having the first maturity date. The system and method further comprise selling a debt instrument to the investor. The debt instrument has a second maturity date that is after the first maturity date. The forward contract is issued by the parent company, the preferred security is issued by the subsidiary, the debt instrument is issued by the subsidiary, and together the forward contract, the preferred security and the debt instrument are a financial instrument.

In one aspect, the system and method further comprise providing a guarantee by the parent on payments due under the debt instrument. In one aspect, the system and method further comprise pledging the preferred security as collateral for settlement of the forward contract. In one aspect, the system and method further comprise pledging the debt instrument as collateral for settlement of the forward contract. In one aspect, the system and method further comprise withholding from the investor a predetermined percentage of stock price upside. In one aspect, the system and method further comprise offering the financial instrument under an SEC registered offering. In one aspect, the system and method further comprise offering the financial instrument under a Rule 144A offering. In one aspect, the predetermined percentage is approximately the first twenty percent. In one aspect, the subsidiary is an offshore subsidiary. In one aspect, the forward is an equity forward. In one aspect, the debt instrument is a bond. In one aspect, the first maturity date is approximately three years after issue of the financial instrument and the second maturity date is approximately five years after issue of the financial instrument. In one aspect, the subsidiary satisfies a test for financing ability independent of the parent. In one aspect, the test for financing ability independent of the parent is substantially as described in Plantation Patterns Inc. v. Commissioner of Internal Revenue, 462 F.2d 712 (5th Cir. 1972). In one aspect, the subsidiary is newly formed.

In one aspect, the invention provides a financial instrument comprising a debt instrument with a maturity date, and a call option with the maturity date, wherein the call option is issued by a parent company and the debt instrument is issued by a subsidiary of the parent company.

In one aspect, the invention further comprises a guarantee by the parent on payments due under the debt instrument. In one aspect, the subsidiary is an offshore subsidiary. In one aspect, the debt instrument is a bond. In one aspect, the subsidiary satisfies a test for financing ability independent of the parent. In one aspect, the test for financing ability independent of the parent is substantially as described in Plantation Patterns Inc. v. Commissioner of Internal Revenue, 462 F.2d 712 (5th Cir. 1972). In one aspect, the subsidiary is newly formed.

In one aspect, the invention provides a system and method for financing by a subsidiary of a parent company. The system and method comprise selling a debt instrument to an investor, the debt instrument having a maturity date. The system and method further comprise selling a call option to the investor, the call option having the maturity date. The call option is issued by the parent, the debt instrument is issued by the subsidiary, and together the call option and debt instrument are a financial instrument.

In one aspect, the invention further comprises providing a guarantee by the parent on payments due under the debt instrument. In one aspect, the invention further comprises offering the financial instrument under an SEC registered offering. In one aspect, the invention further comprises offering the financial instrument under a Rule 144A offering. In one aspect, the subsidiary is an offshore subsidiary. In one aspect, the debt instrument is a bond. In one aspect, the subsidiary satisfies a test for financing ability independent of the parent. In one aspect, the test for financing ability independent of the parent is substantially as described in Plantation Patterns Inc. v. Commissioner of Internal Revenue, 462 F.2d 712 (5th Cir. 1972). In one aspect, the subsidiary is newly formed.

In one aspect, the invention provides a system and method for financing by a subsidiary of a parent company. The system and method comprise selling a convertible debt instrument to an investor, the debt instrument having a maturity date. The system and method further comprise purchasing a first call option on common stock of the parent company, the first call option having the maturity date. The system and method further comprise providing a guarantee of payments under the debt instrument from the parent company.

In one aspect, the invention further comprises offering the convertible debt instrument as an SEC registered offering. In one aspect, the invention further comprises offering the convertible debt instrument as a Rule 144A offering. In one aspect, the first call option is purchased from a third party. In one aspect, the third party hedges the first call option by purchasing a second call option from the parent company on common stock of the parent company. In one aspect, the subsidiary is an offshore subsidiary. In one aspect, the debt instrument is a bond. In one aspect, the subsidiary satisfies a test for financing ability independent of the parent. In one aspect, the test for financing ability independent of the parent is substantially as described in Plantation Patterns Inc. v. Commissioner of Internal Revenue, 462 F.2d 712 (5th Cir. 1972). In one aspect, the subsidiary is newly formed.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

In the Homeland Investment Act of 2004, certain tax benefits are made available to repatriated dividends from offshore subsidiaries. In the various embodiments described below, the invention allows a subsidiary, which is typically an offshore subsidiary, to raise financing in the convertible market and send or repatriate some or all of the proceeds from that financing to the parent as a dividend. Of course, the embodiments are also applicable outside the boundaries of the Homeland Investment Act of 2004.

Example System

Figure 1:
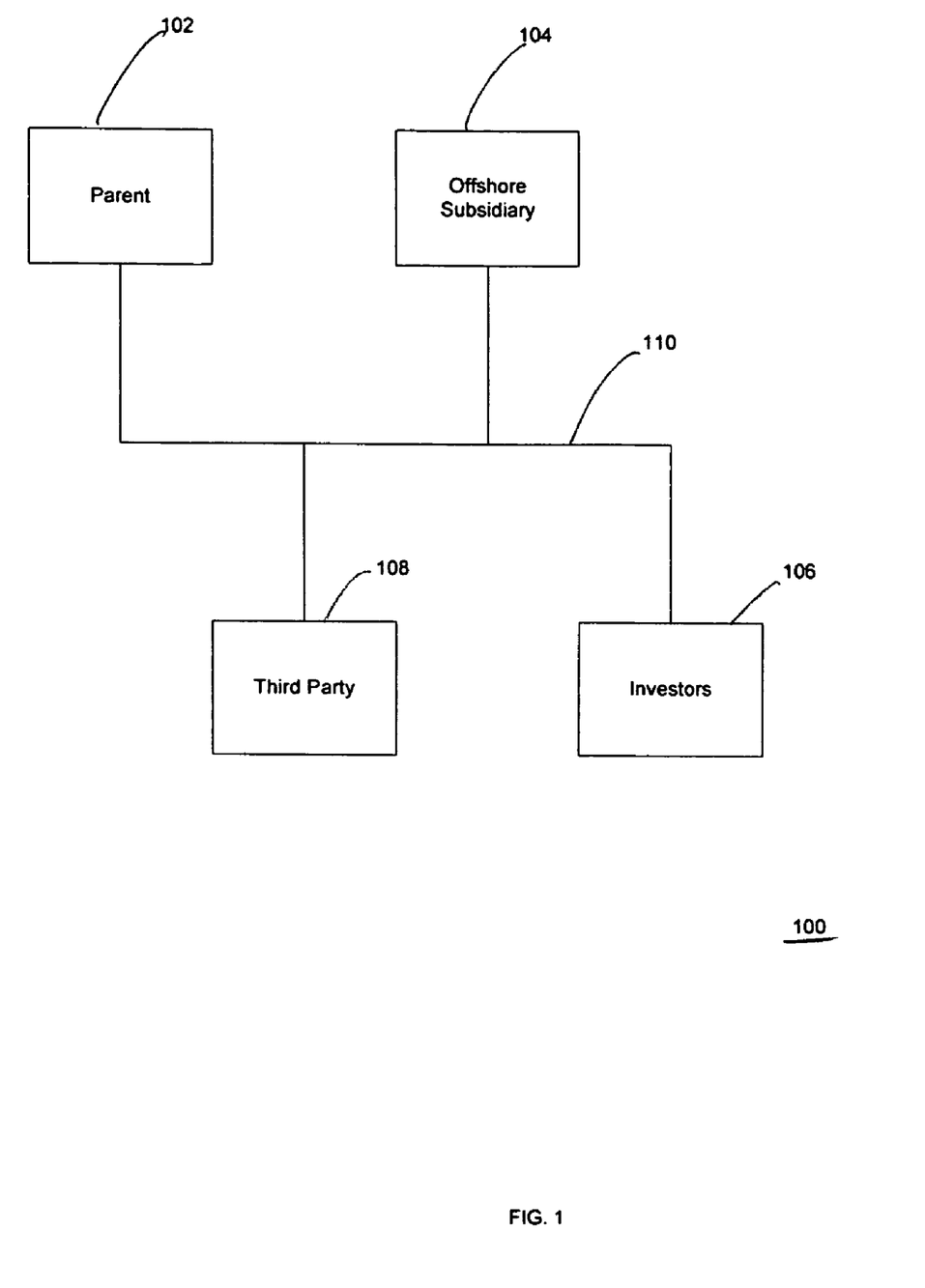
FIG. 1 illustrates a system according to one embodiment.

Referring to FIG. 1, system 100 according to one example embodiment includes a parent company 102, an off-shore subsidiary 104, investors 106 and third party 108. Network 110 (LAN, WAN, extra-net, the Internet, PSTN, etc.) connects parent company 102, off-shore subsidiary 104, investors 106 and third party 108. Although not illustrated, parent company 102, off-shore subsidiary 104, investors 106 and third party 108 have computers with central processors, memory (RAM, ROM, etc.), fixed and removable code storage devices (hard drive, floppy drive, CD, DVD, memory stick, etc.), input/output devices (keyboards, display monitors, pointing devices, printers, etc.), and communication devices (Ethernet cards, WiFi cards, modems, etc.). Network 110 provides a path for data communication, and allows exchange of information signals between the illustrated entities. Software code to accomplish the methods described below may be stored on a computer-readable medium and may also be transmitted as an information signal, such as for download.

FIRST EXAMPLE EMBODIMENT

Figure 2:
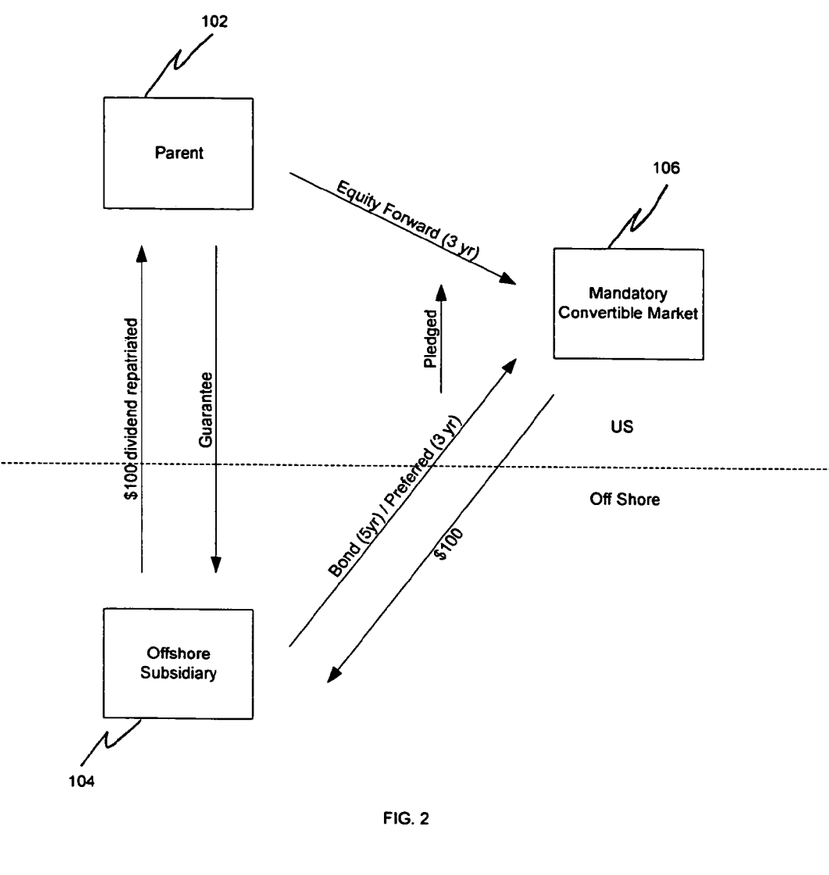
FIG. 2 illustrates relationships between entities in one embodiment.
Figure 3:
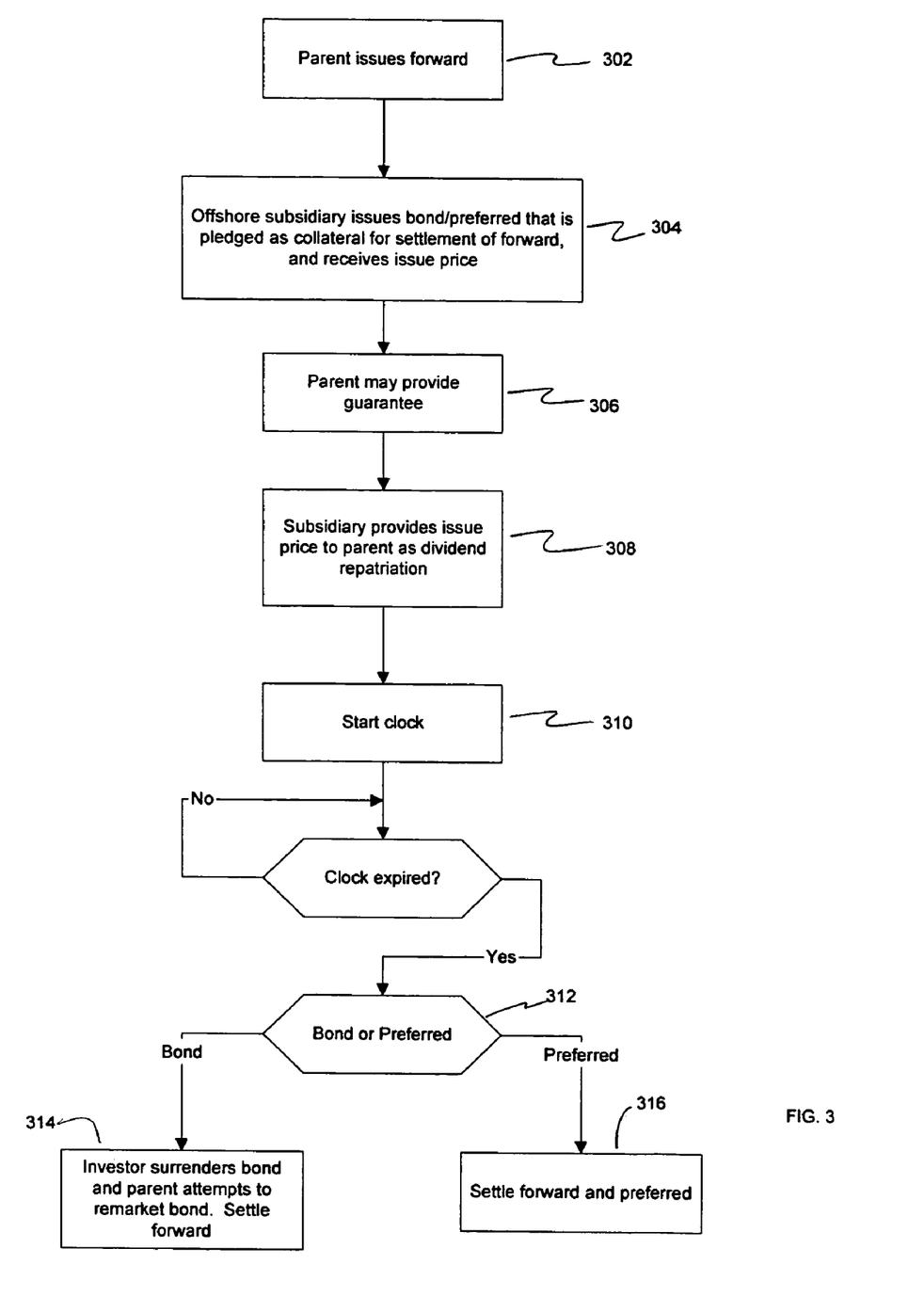
FIG. 3 illustrates steps in a method according to one embodiment.

Referring to FIGS. 2 and 3, in one embodiment, at step 302, parent 102 issues a forward, and at step 304, offshore subsidiary 104 issues a debt instrument/preferred security. In one embodiment, the forward is an equity forward on common stock of the parent that is structured so the issuer retains or withholds approximately the first 20% of common stock price increase. In this manner, investors do not participate in that first percentage of stock price upside. In one embodiment, the forward and the preferred security have the same maturity (e.g., approximately three years), and the debt instrument has a longer maturity (e.g., approximately five years). The debt instrument is a bond in one embodiment. At step 306, parent 102 may provide a guarantee on payments due under the debt instrument. The debt instrument/preferred is pledged as collateral for settlement of the forward, and the two instruments (the forward and the debt instrument/preferred) are a financial instrument that is issued to the mandatory convertible market where it is purchased by investors 106. The proceeds from the purchase go first to offshore subsidiary 104 and then at step 308 to parent 102 as a repatriated dividend.

A three year or other maturity clock for the forward and preferred starts at step 310. Upon expiration of the maturity clock, then at step 312 system 100 determines whether the instrument is a bond, or a preferred. If it is a bond, then at step 314, issuer 102 receives the debt instrument from investors 106 and re-markets the debt by selling it to new investors. In one embodiment, the money received from re-marketing the debt instrument is applied to purchase the shares under the forward. If for some reason the re-marketing fails, the issuer takes the debt and stock-settles the forward.

If the instrument is a preferred, then at step 316, investor 106 settles the forward and preferred.

In various embodiments, settlement may be physical, cash or net share.

An equity forward is a contract, and in the example above, it requires the investor to buy a specified number of shares of equity (common stock) at a three year forward date at a forward price. If the common stock price is trading below $10 when the forward is settled, the investor must buy 1 share. If the common stock is trading at $12 or above ($12 is equal to a 20% stock price increase), the investor must buy 0.833 shares. At a $12 common stock price, this is equal to $10 of value ($12*0.8333=$10). If the stock price is trading between $10 and $12, the investors receive a fractional number of shares equal to $10 of value.

Figure 4:
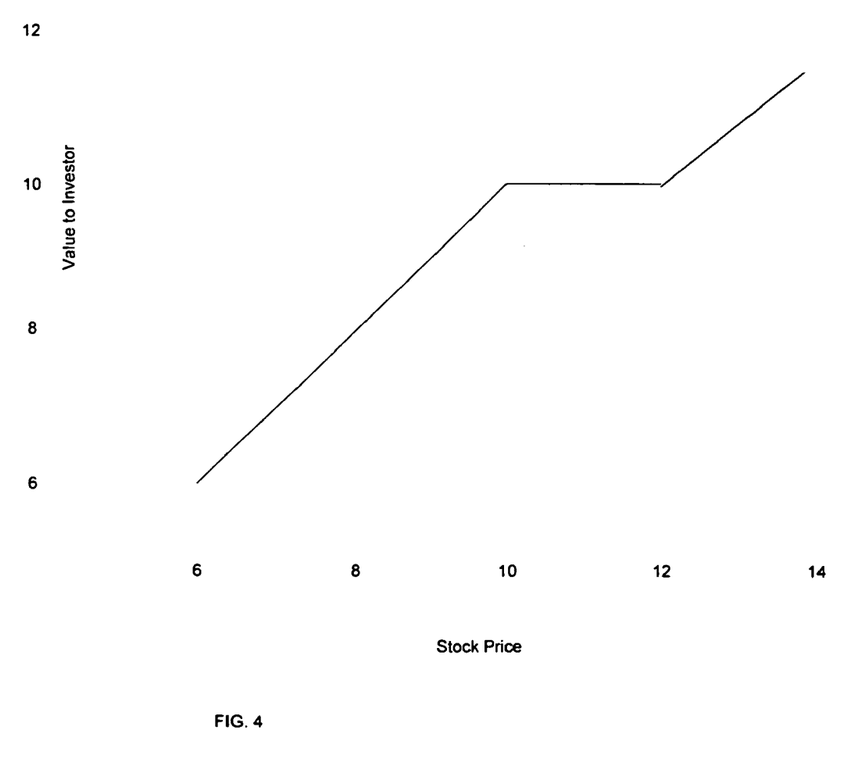
FIG. 4 illustrates investor value and stock price according to one embodiment.

A three year equity forward together with a straight preferred that has a three year maturity, or a bond (remarketed in year 3) have the same economic features as a mandatory convertible. For a mandatory convertible preferred, at the three year maturity, the investor surrenders the mandatory convertible preferred and receives a specified number of shares of common stock according to the common stock price at the three year maturity. If the stock price is trading at less than the forward price of $10, the investor receives one share. If the stock price is trading at $12 or more, the investor receives 0.833 shares. If the stock price is trading between $10 and $12, the investors receive a fractional number of shares equal to $10 of value. The return to the investor is illustrated in FIG. 4, and is the same for a mandatory convertible preferred and the described financial instrument that includes the equity forward with a debt instrument/preferred.

The structure illustrated in FIGS. 2 and 3 and described above can be broadly marketed as an SEC registered offering, and it receives high equity credit from rating agencies because settlement is generally in shares and not in cash. In addition, the earnings per share treatment at the parent is treasury stock accounting. The longer-term debt (a five year bond in the example embodiment) that is included with the three year preferred allows a tax deduction for the structure, which is typically not available with a mandatory convertible preferred or a combined equity forward and preferred. The additional feature of combining a longer-term maturity five year bond with the three year equity forward helps to avoid the U.S. Internal Revenue Service integration rules and to make the structure tax deductible.

At the end of three years, after re-marketing the debt, the company has issued common stock and has debt outstanding and has received a tax deduction. This structure is also applicable in non-U.S. jurisdictions.

This structure allows high equity credit and repatriation of the cash dividend simultaneously. It also protects the parent credit rating, and the treasury stock earnings per share treatment (where applicable) means fractional shares are added to share count as stock price rises. The entire proceeds of the offering are available to repatriate dividend (there is no leakage), and it expands the investor base to the mandatory convertible market to optimize pricing.

In the structure illustrated in FIGS. 2 and 3, (where the guarantee is provided) one way the offshore subsidiary may show financing ability is according to the "Plantation Patterns" test. This generally means that the offshore subsidiary is credit worthy without or independent of the parent guarantee, although the parent guarantee may serve to provide a better rate. The "Plantation Patterns" test is described generally in *Plantation Patterns, Inc. v. Commissioner of Internal Revenue*, 462 F.2d 712 (5th Cir. 1972).

SECOND EXAMPLE EMBODIMENT

Figure 5:
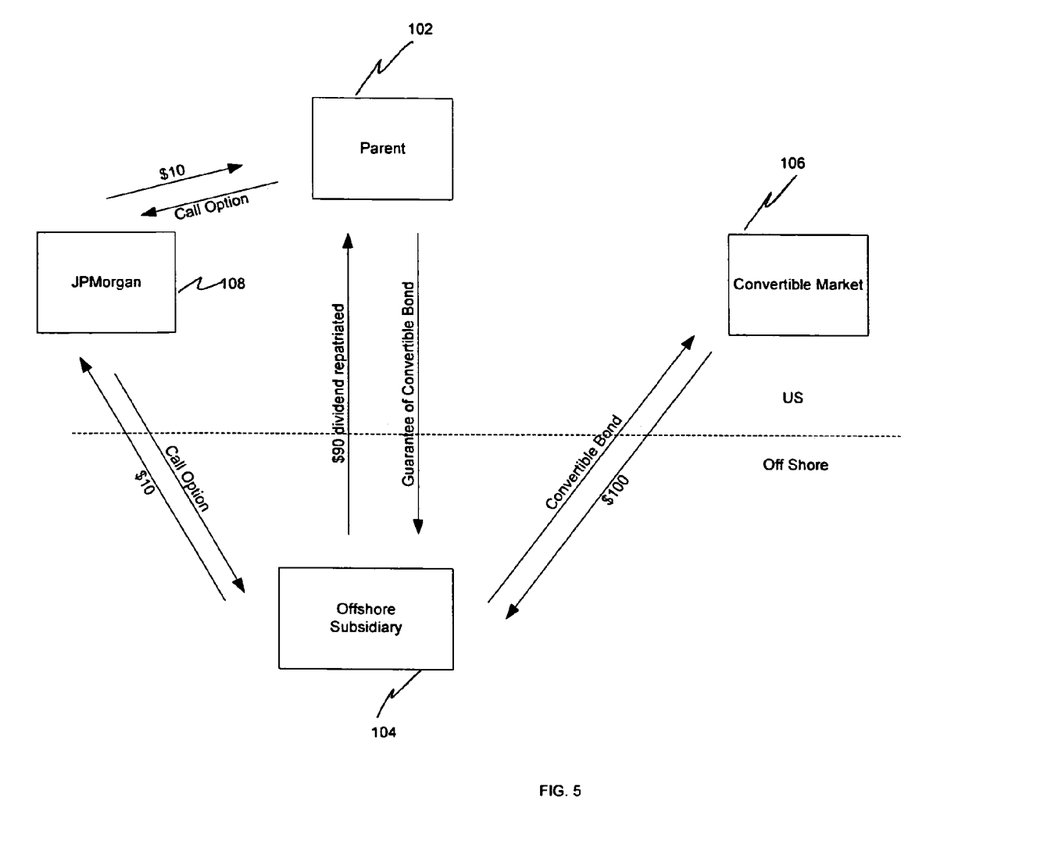
FIG. 5 illustrates relationships between entities in one embodiment.
Figure 6:
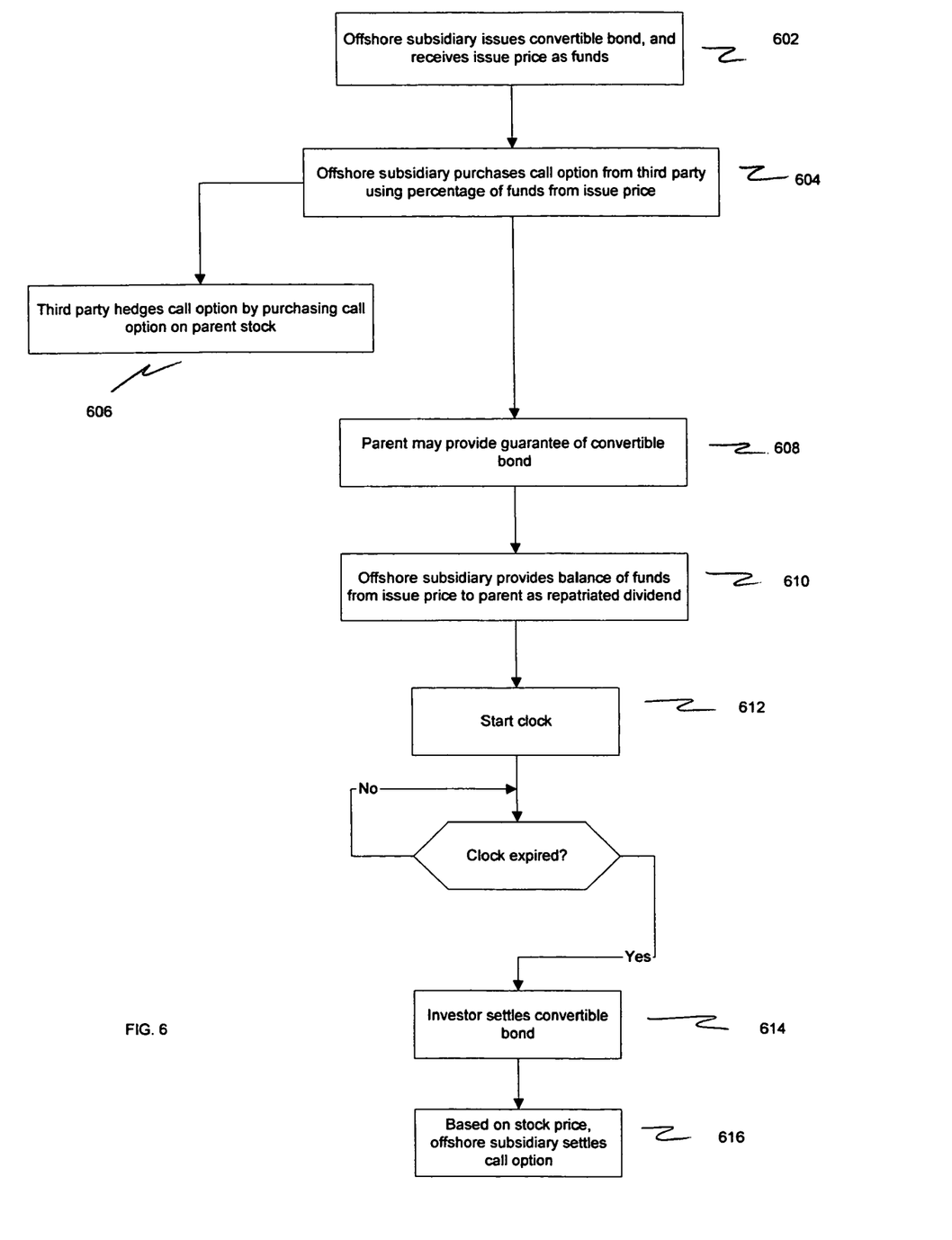
FIG. 6 illustrates steps in a method according to one embodiment.

Referring to FIGS. 5 and 6, another embodiment begins at step 602 with offshore subsidiary 104 issuing a convertible bond to the convertible bond market. The convertible bond is purchased by investors 106.

At step 604, offshore subsidiary 104 purchases a call option from third party 108 on common stock of parent 102. The call option purchase uses a percentage of the proceeds from the convertible bond issue. The call option and the convertible bond have similar or compatible terms (maturity, etc.). Although not required, at step 606 third party 108 may hedge the call that was sold to offshore subsidiary 104 by purchasing a call option from parent 102 (or another party) with the same or similar terms as the call purchased by offshore subsidiary 104 at step 604. Purchase of the call option from third party 108 instead of directly from parent 102 helps to avoid concerns about disposition of parent stock at the time of convertible debt settlement.

At step 608, parent 102 may provide a guarantee of the convertible bond to its face value, and at step 610, offshore subsidiary 104 provides the balance of the funds from the issue price of the convertible bond to parent 102 as a repatriated dividend.

At step 612, a multi-year maturity clock corresponding to the convertible and call option maturity starts, and upon expiration, at steps 614 and 616, subsidiary 104, third party 108 and investor 106 settle the call and convertible bond. In one embodiment, this is a net share settlement.

Net share settlement can be described with the following example: For a one year call option, with $10 stock price and $10 strike price, within 1 year the holder can deliver the call option along with $10, and receive one share of common stock. If the price of common stock is $15.00 when the call option is exercised, the investor can sell the share for $15, and has $5 increase in value which is the in-the-money value of the call option. Net share settlement means that the company gives the investor the in-the-money amount of value in shares ($5/$15 or 0.33 shares in this example) instead of having the investor deliver the $10 in cash and get back a share worth $15.00. Net share settlement can be advantageous where the issuer is dilution sensitive.

In the structure of FIGS. 5 and 6, the earnings per share treatment at the parent is based on the convertible coupon as interest and treasury stock impact of the sold call option. The interest expense is based on the convertible coupon, and treasury stock treatment of the sold call option is fractional shares added as stock price rise, both providing better earnings per share at the parent. The call option premium received at parent 102 is neither taxable nor included as profit and loss income.

The structure of FIGS. 5 and 6 can be structured as an SEC registered or Rule 144A offering. Offshore subsidiary 104 generally satisfies the "Plantation Patterns" test described above, and any tax deductions may depend on the laws of the offshore jurisdiction. Under the IRS rules, the $10 call option premium could be characterized as a Section 956 payment. Disclosure of stand-alone offshore subsidiary financials should be prevented by adding a newly formed offshore capital raising subsidiary.

Figure 7:
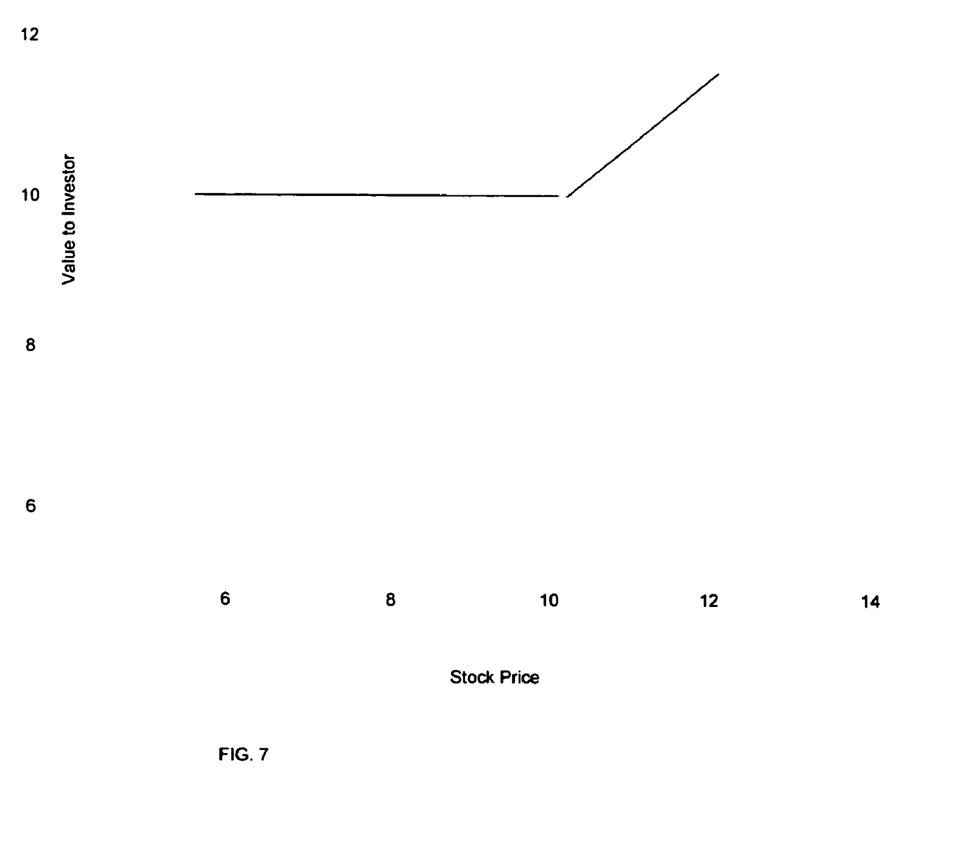
FIG. 7 illustrates investor value and stock price according to one embodiment.

The structure illustrated in FIGS. 5 and 6 offers down-side protection to investors 106, as illustrated in FIG. 7.

THIRD EXAMPLE EMBODIMENT

Figure 8:
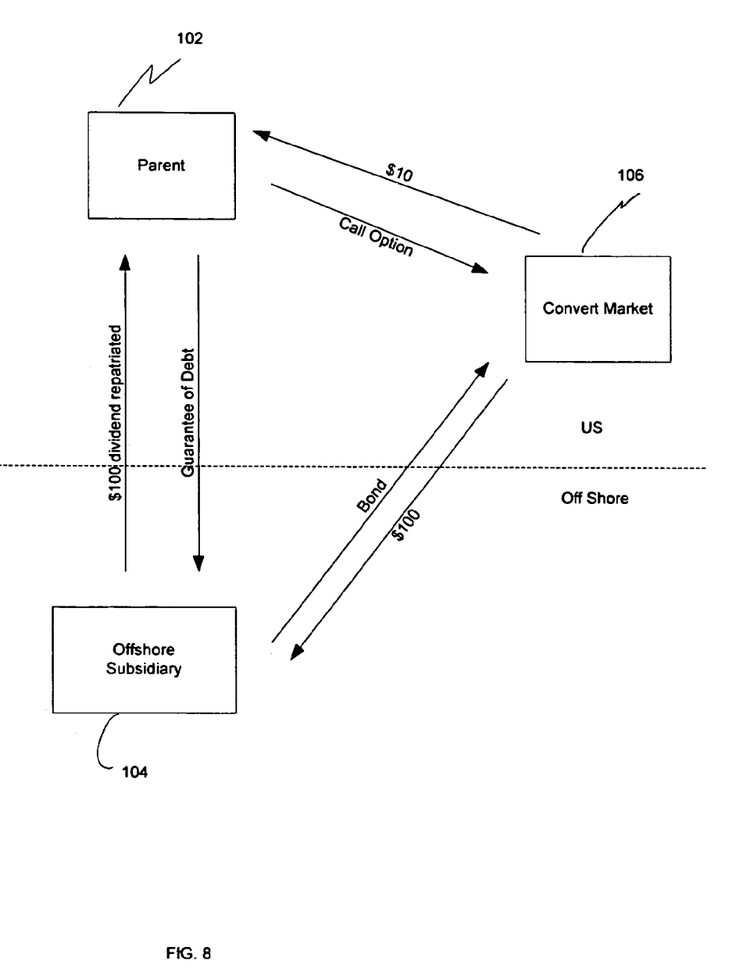
FIG. 8 illustrates relationships between entities in one embodiment.
Figure 9:
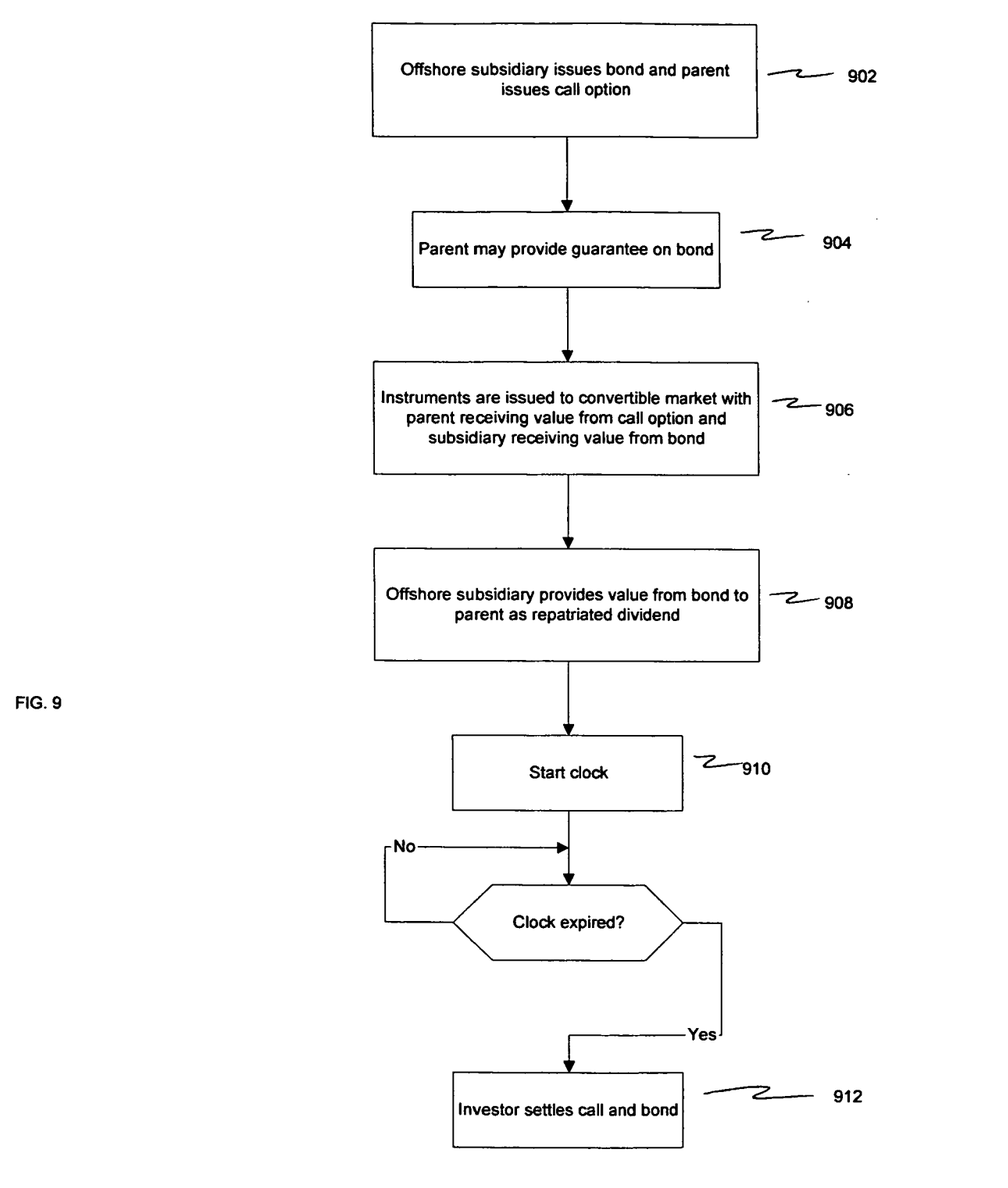
FIG. 9 illustrates steps in a method according to one embodiment.

Referring to FIGS. 8 and 9 an embodiment begins at step 902 with parent 102 and subsidiary 104 selling to the same investors a straight bond issued by subsidiary 104, and a call option, issued by parent 102. Generally, appropriate terms of the debt and call are the same or compatible (maturity, etc.). At step 904, parent 102 may provide a guarantee on payments due under the bond.

At step 906, the two instruments are issued to the convertible market and purchased by investors 106. Parent 102 receives value from the purchase corresponding to the value of the call option, while offshore subsidiary 104 receives value from the purchase corresponding to the value of the bond.

At step 908, offshore subsidiary 104 provides, as a repatriated dividend to parent 102, the value received from the purchase corresponding to the value of the bond.

At step 910, a multi-year maturity clock corresponding to maturity of the bond and call option starts, and upon expiration, at step 912, parent 102, subsidiary 104 and investor 106 settle the call and bond. In various embodiments, this is a physical settlement, cash settlement or net share settlement.

The straight debt and call option in these embodiments are economically equivalent to a convertible bond. The offering can be executed as an SEC registered or Rule 144A offering. Earnings per share at the parent of the call option is treasury stock accounting and it is possible that accounting interest expenses at the parent may be based on straight debt cost if interest accretion is created at the offshore subsidiary. Tax deductions on the debt will generally depend on the laws of the offshore jurisdiction.

The structure illustrated in FIGS. 8 and 9 provides a lower cash cost of capital as compared to straight debt because of the call option sale. In addition, sale of the call option directly by parent 102 avoids some tax concerns and issues. Offshore subsidiary may need to satisfy the "Plantation Patterns" test described above. Accounting interest accretion at the offshore subsidiary may cause earnings per share at parent 102 to include interest expense equal to straight debt cost. Disclosure of stand-alone offshore subsidiary financials may be avoided by adding a newly formed offshore capital raising subsidiary.

The structure illustrated in FIGS. 8 and 9 also offers downside protection to investors 106, as illustrated in FIG. 7.

Although illustrative embodiments have been described herein in detail, it should be noted and will be appreciated by those skilled in the art that numerous variations may be made within the scope of this invention without departing from the principle of this invention and without sacrificing its chief advantages.

For example similar strategies may not use the proceeds to repatriate earnings, but may use the proceeds to fund local operations or other corporate purposes at the offshore subsidiary.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A computer-implemented method for financing by a subsidiary of a parent company, the method comprising:
    selling a forward contract to a first investor using a programmed computer, the forward contract having a first maturity date;
    selling a preferred security to the first investor using the programmed computer, the preferred security having the first maturity date;
    selling a debt instrument to the first investor using the programmed computer, the debt instrument having a second maturity date that is after the first maturity date, wherein the forward contract is issued by the parent company, the preferred security is issued by the subsidiary, the debt instrument is issued by the subsidiary, and together the forward contract, the preferred security and the debt instrument are included as parts of a single financial instrument at the time of sale to the first investor;
    determining whether the debt instrument is a bond or a preferred security after expiration of the first maturity date; and
    receiving the debt instrument from the first investor if the instrument is a bond.

2. A method according to claim 1, further comprising providing a guarantee by the parent on payments due under the debt instrument.

3. A method according to claim 1, further comprising pledging the preferred security as collateral for settlement of the forward contract.

4. A method according to claim 1, further comprising pledging the debt instrument as collateral for settlement of the forward contract.

5. A method according to claim 1, further comprising withholding from the first investor a predetermined percentage of stock price upside.

6. A method according to claim 5, wherein the predetermined percentage is approximately the first twenty percent.

7. A method according to claim 1, further comprising offering the financial instrument under an SEC registered offering.

8. A method according to claim 1, further comprising offering the financial instrument under a Rule 144A offering.

9. A method according to claim 1, wherein the subsidiary is an offshore subsidiary.

10. A. method according to claim 1, wherein the forward is an equity forward.

11. A method according. to claim 1, wherein the debt instrument is a bond.

12. A method according to claim 1, wherein the first maturity date is approximately three years after issue of the financial instrument and the second maturity date is approximately five years after issue of the financial instrument.

13. A method according to claim 1, wherein the subsidiary satisfies a test for financing ability independent of the parent.

14. A method according to claim 13, wherein the test for financing ability independent of the parent is substantially as described in Plantation Patterns Inc. v. Commissioner of Internal Revenue, 462 F.2d 712 (5th Cir. 1972).

15. A method according to claim 1, wherein the subsidiary is newly formed.

16. A computer usable medium having a computer readable program code embodied therein, the computer readable program code adapted to be executed to implement a method for financing by a subsidiary of a parent company, the method comprising:
    selling a forward contract to an investor using the programmed computer, the forward contract having a first maturity date;
    selling a preferred security to the investor using the programmed computer, the preferred security having the first maturity date;
    selling a debt instrument to the investor using the programmed computer, the debt instrument having a second maturity date that is after the first maturity date, wherein the forward contract is issued by the parent company, the preferred security is issued by the subsidiary, the debt instrument is issued by the subsidiary, and together the forward contract, the preferred security and the debt instrument are included as parts of a single financial instrument at the time of sale to an investor;
    determining whether the debt instrument is a bond or a preferred security after expiration of the first maturity date; and
    receiving the debt instrument from the investor if the instrument is a bond.

17. The computer-implemented method of claim 1 further comprising re-selling the debt instrument to a second investor.

18. The computer-implemented method of claim 1 further comprising receiving a settlement of the forward contract and the preferred security from the first investor if the debt instrument is the preferred security.

* * * * *